United States Patent
Krisko et al.

(10) Patent No.: US 7,138,182 B2
(45) Date of Patent: Nov. 21, 2006

(54) TEMPERABLE HIGH SHADING PERFORMANCE COATINGS

(75) Inventors: Annette J. Krisko, Prairie de Sac, WI (US); Gary Pfaff, Cazenovia, WI (US)

(73) Assignee: Cardinal CG Compay, Eden Prairie, MN (US)

( * ) Notice: Subject to any disclaimer, the term of this patent is extended or adjusted under 35 U.S.C. 154(b) by 278 days.

(21) Appl. No.: 10/632,119

(22) Filed: Jul. 31, 2003

(65) Prior Publication Data

US 2004/0071985 A1   Apr. 15, 2004

(51) Int. Cl.
*B32B 17/06* (2006.01)

(52) U.S. Cl. ............ 428/433; 428/432; 428/697; 428/698; 428/699; 428/701; 428/702; 428/704

(58) Field of Classification Search ......... 428/428, 428/433, 434, 697, 698, 699, 701, 702, 704
See application file for complete search history.

(56) References Cited

U.S. PATENT DOCUMENTS

| | | | | |
|---|---|---|---|---|
| 2,207,656 A | 7/1940 | Cartwright | ............... | 359/580 |
| 3,516,720 A | 6/1970 | Mauer | ............... | 359/360 |
| 3,537,944 A | 11/1970 | Gubb | ............... | 428/34 |
| 3,682,528 A | 8/1972 | Apfel et al. | ............... | 350/1 |
| 3,781,077 A | 12/1973 | Groth | ............... | 359/360 |
| 3,978,272 A | 8/1976 | Donley | ............... | 428/434 |
| 3,978,273 A | 8/1976 | Groth | ............... | 428/434 |
| 3,990,784 A | 11/1976 | Gelber | ............... | 350/166 |
| 4,098,956 A | 7/1978 | Blickensderfer | ............... | 428/627 |
| 4,235,048 A | 11/1980 | Gillery | ............... | 49/390 |
| 4,313,647 A | 2/1982 | Takazawa | ............... | 359/588 |
| 4,327,967 A | 5/1982 | Groth | ............... | 350/258 |
| 4,348,453 A | 9/1982 | Cohen | ............... | 428/333 |
| 4,413,877 A | 11/1983 | Suzuki et al. | ............... | 350/1.7 |
| 4,440,822 A | 4/1984 | Gordon | ............... | 428/216 |
| 4,462,883 A | 7/1984 | Hart | ............... | 204/192 C |
| 4,487,197 A | 12/1984 | Hoyois | ............... | 359/360 |
| 4,497,700 A | 2/1985 | Groth | ............... | 204/192 |
| 4,534,841 A | 8/1985 | Hartig et al. | ............... | 204/192 P |
| 4,548,691 A | 10/1985 | Dietrich et al. | ............... | 204/192 P |
| 4,583,815 A | 4/1986 | Taga et al. | ............... | 350/1.6 |
| 4,610,771 A | 9/1986 | Gillery | ............... | 204/192 |
| 4,639,069 A | 1/1987 | Yatabe | ............... | 359/360 |
| 4,735,488 A | 4/1988 | Rancourt | ............... | 359/586 |
| 4,786,784 A | 11/1988 | Nikodem et al. | ............... | 219/543 |
| 4,790,922 A | 12/1988 | Huffer | ............... | 204/192.27 |
| 4,806,220 A | 2/1989 | Finley | ............... | 204/192.27 |
| 4,834,857 A | 5/1989 | Gillery | ............... | 204/192.27 |
| 4,847,157 A | 7/1989 | Goodman et al. | ............... | 428/426 |
| 4,847,158 A | 7/1989 | Gillery | ............... | 428/433 |
| 4,883,721 A | 11/1989 | Nalepka et al. | ............... | 428/623 |
| 4,896,928 A | 1/1990 | Perilloux et al. | ............... | 350/1.6 |
| 4,898,789 A | 2/1990 | Finley | ............... | 428/623 |
| 4,902,081 A | 2/1990 | Huffer | ............... | 350/1.7 |

(Continued)

FOREIGN PATENT DOCUMENTS

AU   0048985   2/2001   ............... 5/28

(Continued)

*Primary Examiner*—Jennifer C. McNeil
*Assistant Examiner*—G. Blackwell
(74) *Attorney, Agent, or Firm*—Fredrikson & Byron, P.A.

(57) ABSTRACT

The invention provides temperable high shading performance low-emissivity coatings. The invention also provides insulating glass units, monolithic panes, and other substrates bearing such coatings. Further, the invention provides methods of producing coated substrates by depositing coatings of this nature.

32 Claims, 5 Drawing Sheets

U.S. PATENT DOCUMENTS

| | | | |
|---|---|---|---|
| 4,902,580 A | 2/1990 | Gillery | 428/623 |
| 4,902,581 A | 2/1990 | Criss | 428/627 |
| 4,919,778 A | 4/1990 | Dietrich et al. | 204/192.27 |
| 4,964,963 A | 10/1990 | Criss | 204/192 |
| 4,971,843 A | 11/1990 | Michelotti et al. | 428/34 |
| 4,985,312 A | 1/1991 | Furuya et al. | 428/627 |
| 4,996,105 A | 2/1991 | Oyama | 428/336 |
| 4,997,013 A | 3/1991 | Peckels | 141/95 |
| 5,055,358 A | 10/1991 | Livingston | 428/433 |
| 5,059,295 A | 10/1991 | Finley | 204/192.27 |
| 5,059,458 A | 10/1991 | Goodall | 428/34 |
| 5,073,451 A | 12/1991 | Iida | 428/336 |
| 5,087,525 A | 2/1992 | Goodman et al. | 428/428 |
| 5,110,662 A | 5/1992 | Depauw et al. | 428/192 |
| 5,112,693 A | 5/1992 | Gillery | 428/432 |
| 5,173,800 A | 12/1992 | King | 359/360 |
| 5,214,530 A | 5/1993 | Coombs | 359/359 |
| 5,216,542 A | 6/1993 | Szczyrbowski | 359/588 |
| 5,229,881 A | 7/1993 | Day et al. | 359/360 |
| 5,298,048 A | 3/1994 | Lingle et al. | 65/60.2 |
| 5,302,449 A | 4/1994 | Eby et al. | 428/336 |
| 5,306,547 A | 4/1994 | Hood | 428/213 |
| 5,334,718 A | 8/1994 | Thomas | 546/118 |
| 5,337,191 A | 8/1994 | Austin | 359/885 |
| 5,348,805 A | 9/1994 | Zagdoun et al. | 428/432 |
| 5,376,455 A | 12/1994 | Hartig et al. | 428/428 |
| 5,377,045 A | 12/1994 | Wolfe et al. | 359/585 |
| 5,450,238 A | 9/1995 | Bjornard | 359/580 |
| 5,514,476 A | 5/1996 | Hartig et al. | 428/426 |
| 5,520,996 A | 5/1996 | Balian et al. | 428/216 |
| 5,543,229 A | 8/1996 | Ohsaki et al. | 428/432 |
| 5,552,180 A | 9/1996 | Finley et al. | 427/165 |
| 5,557,462 A | 9/1996 | Hartig et al. | 359/585 |
| 5,563,734 A | 10/1996 | Wolfe et al. | 359/360 |
| 5,584,902 A | 12/1996 | Hartig et al. | 65/32.4 |
| 5,595,825 A | 1/1997 | Guiselin | 428/428 |
| 5,635,287 A | 6/1997 | Balian et al. | 428/216 |
| 5,691,044 A | 11/1997 | Oyama | 428/216 |
| 5,693,415 A | 12/1997 | Zait et al. | 428/332 |
| 5,750,265 A | 5/1998 | Goodman | 428/432 |
| 5,770,321 A | 6/1998 | Hartig et al. | 428/622 |
| 5,776,603 A | 7/1998 | Zagdoun | 428/336 |
| 5,780,149 A | 7/1998 | McCurdy et al. | 428/336 |
| 5,800,933 A | 9/1998 | Hartig et al. | 428/622 |
| 5,821,001 A | 10/1998 | Arbab et al. | 428/623 |
| 5,837,361 A | 11/1998 | Glaser et al. | 428/216 |
| 5,891,556 A | 4/1999 | Anderson | 428/216 |
| 5,897,857 A | 4/1999 | Hillebrand | 424/703 |
| 5,897,957 A | 4/1999 | Goodman | 428/432 |
| 5,902,505 A | 5/1999 | Finley | 219/547 |
| 5,938,898 A | 8/1999 | Ando | 204/192.23 |
| 5,942,319 A | 8/1999 | Oyama | 428/216 |
| 5,942,338 A | 8/1999 | Arbab et al. | 428/623 |
| RE36,308 E | 9/1999 | Yang | 359/585 |
| 5,948,538 A | 9/1999 | Brochot et al. | 428/432 |
| 5,952,084 A | 9/1999 | Anderson et al. | 428/212 |
| 5,965,246 A | 10/1999 | Guiselin et al. | 428/212 |
| 6,007,901 A | 12/1999 | Maschwitz et al. | 428/216 |
| 6,014,872 A | 1/2000 | Hartig et al. | 65/58 |
| 6,020,077 A | 2/2000 | Schicht et al. | 428/622 |
| 6,030,671 A | 2/2000 | Yang et al. | 428/34 |
| 6,034,813 A | 3/2000 | Woodard et al. | 359/360 |
| 6,042,934 A | 3/2000 | Guiselin et al. | 428/213 |
| 6,045,896 A | 4/2000 | Boire et al. | 428/216 |
| 6,048,621 A | 4/2000 | Gallego | 428/432 |
| 6,059,909 A | 5/2000 | Hartig et al. | 156/109 |
| 6,060,178 A | 5/2000 | Krisko et al. | 428/627 |
| 6,074,730 A | 6/2000 | Laird et al. | 428/212 |
| 6,124,026 A | 9/2000 | McCurdy et al. | 428/216 |
| 6,132,881 A | 10/2000 | Hartig et al. | 428/432 |
| 6,150,028 A | 11/2000 | Mazon | 428/426 |
| 6,154,598 A | 11/2000 | Gavrilovic et al. | 385/141 |
| 6,159,607 A | 12/2000 | Hartig et al. | 428/426 |
| 6,159,621 A | 12/2000 | Schicht et al. | 428/633 |
| 6,165,598 A | 12/2000 | Nelson | 428/212 |
| 6,174,599 B1 | 1/2001 | Boire et al. | 428/336 |
| 6,188,512 B1 | 2/2001 | Woodard | 359/359 |
| 6,190,776 B1 | 2/2001 | Demiryont | 428/434 |
| 6,210,784 B1 | 4/2001 | Rondeau et al. | 428/212 |
| 6,218,018 B1 | 4/2001 | McKown et al. | 428/432 |
| 6,231,992 B1 | 5/2001 | Niebauer | 428/472 |
| 6,231,999 B1 | 5/2001 | Krisko | 428/627 |
| 6,246,523 B1 | 6/2001 | Bradley | 359/585 |
| 6,262,830 B1 | 7/2001 | Scalora | 359/248 |
| 6,266,193 B1 | 7/2001 | Saif et al. | 359/582 |
| 6,274,244 B1 | 8/2001 | Finley et al. | 428/433 |
| 6,284,385 B1 | 9/2001 | Guillaumon et al. | 428/450 |
| 6,287,675 B1 | 9/2001 | Guiselin et al. | 428/213 |
| 6,306,525 B1 | 10/2001 | Schicht | 428/633 |
| 6,335,142 B1 | 1/2002 | Quesnel | 430/275.1 |
| 6,337,124 B1 | 1/2002 | Anderson | 428/216 |
| 6,344,288 B1 | 2/2002 | Oyama | 428/701 |
| 6,355,334 B1 | 3/2002 | Rondeau et al. | 428/212 |
| 6,650,478 B1 | 11/2003 | DeBusk | 359/585 |
| 6,838,159 B1 | 1/2005 | Eby | 428/216 |
| 2001/0003628 A1 | 6/2001 | Demiryant | 428/630 |
| 2001/0006734 A1 | 7/2001 | Demiryont | 428/432 |
| 2001/0021540 A1 | 9/2001 | Woodard | 438/98 |
| 2001/0044032 A1 | 11/2001 | Finley et al. | 428/433 |
| 2001/0053439 A1 | 12/2001 | Guiselin et al. | 428/213 |
| 2002/0009601 A1 | 1/2002 | Stachowiak | 428/432 |
| 2002/0016250 A1 | 2/2002 | Hayakawa et al. | 502/5 |
| 2002/0034641 A1 | 3/2002 | Ebisawa et al. | 428/426 |
| 2002/0037414 A1 | 3/2002 | Cunningham | 428/412 |
| 2002/0037421 A1 | 3/2002 | Arnaud et al. | 428/472 |
| 2002/0045037 A1 | 4/2002 | Boire et al. | 428/216 |
| 2002/0136905 A1 | 9/2002 | Medwick et al. | 428/432 |
| 2003/0049464 A1 | 3/2003 | Glenn et al. | 428/432 |
| 2003/0148115 A1 | 8/2003 | Glenn et al. | 428/432 |
| 2003/0165693 A1 | 9/2003 | Hartig et al. | 428/426 |
| 2003/0165694 A1 | 9/2003 | Hartig et al. | 428/428 |
| 2003/0186064 A1 | 10/2003 | Murata et al. | 428/432 |
| 2004/0009356 A1 | 1/2004 | Medwick | 428/432 |
| 2004/0016202 A1 * | 1/2004 | Hoffman | 52/786.13 |
| 2004/0071985 A1 | 4/2004 | Krisko | 428/434 |
| 2004/0241457 A1 | 12/2004 | Macquart | 428/432 |
| 2004/0247929 A1 | 12/2004 | Buhay | 428/621 |
| 2005/0123772 A1 | 6/2005 | Coustet | 428/432 |

FOREIGN PATENT DOCUMENTS

| | | | |
|---|---|---|---|
| EP | 0847965 | 12/1997 | |
| EP | 0341002 | 2/1999 | 19/8 |
| EP | 1044934 | 10/2000 | 17/36 |
| EP | 1329307 | 7/2003 | |
| WO | WO 9748649 | 12/1997 | |
| WO | WO 99/58736 A2 | 11/1999 | |
| WO | WO 02/18132 | 3/2002 | |
| WO | WO 0226488 | 4/2002 | |
| WO | WO 02/48065 | 6/2002 | 17/36 |
| WO | WO 03074442 | 9/2003 | |
| WO | WO 030374441 | 12/2003 | |

* cited by examiner

TEMPERABLE HIGH SHADING PERFORMANCE COATINGS

FIELD OF THE INVENTION

The present invention provides coatings for glass and other substrates. More particularly, this invention provides temperable coatings that offer high shading performance. The invention also provides methods for producing coatings of this nature, as well as IG units, monolithic panes, and other substrates bearing these coatings.

BACKGROUND OF THE INVENTION

Low-emissivity coatings are well known in the present art. Typically, they include one or more infrared-reflective films each positioned between two or more transparent dielectric films. The infrared-reflective films, which are typically conductive metals such as silver, gold, or copper, reduce the transmission of radiant heat through the coating (e.g., by reflecting infrared radiation). The transparent dielectric films are used primarily to reduce visible reflectance and to control other coating properties, such as color. Commonly used transparent dielectrics include oxides of zinc, tin, and titanium, as well as nitrides, such as silicon nitride.

In addition to the infrared reflection provided by low-emissivity coatings, these coatings can be engineered to provide desired shading properties. As is well known, the solar heat gain coefficient (SHGC) of a window is the fraction of incident solar radiation that is admitted through a window. There are a number of applications where low solar heat gain windows are of particular benefit. In warm climates, it is especially desirable to have low solar heat gain windows. For example, solar heat gain coefficients of about 0.4 and below are generally recommended for buildings in the southern United States. Further, windows that are exposed to a lot of undesirable sun benefit from having a low solar heat gain coefficient. For example, windows on the east or west side of a building tend to get a lot of sun in the morning and afternoon. For applications like these, the solar heat gain coefficient of a window plays a vital role in maintaining a comfortable environment within the building. Thus, it is beneficial to provide windows of this nature with coatings that establish a low solar heat gain coefficient (i.e., high shading ability coatings).

A tradeoff is sometimes made in high shading ability coatings whereby the films selected to achieve a low SHGC have the effect of increasing the visible reflectance to a higher level than is ideal. As a consequence, windows bearing these coatings may have a somewhat mirror-like appearance. It would be desirable to provide a high shading ability coating that has sufficiently low visible reflectance to obviate this mirror-like appearance problem.

In addition to having undesirably high visible reflectance, the transmitted and reflected colors of conventional high shading ability coatings tend not to be ideal. For example, these coatings commonly exhibit hues that are more red and/or yellow than is desired. To the extent a coating has a colored appearance, it is pleasing if the coating exhibits a transmitted and/or reflected hue that is blue or blue-green. The chroma of these coatings tends also to be greater than is desired. In most cases, it is preferable to provide a coating that is as color neutral (i.e., colorless) as possible. Thus, the reflected and transmitted colors of conventional low solar heat gain coatings tend to be less than ideal, both in terms of hue and chroma.

It is extremely challenging to produce any low-emissivity coating that exhibits the desirable properties described herein. These desirable coating properties are even more difficult to achieve in a temperable coating. Glass tempering typically involves heating glass to elevated temperatures on the order of 680 degrees C. and above (e.g., commonly reaching about 695 degrees C.). As is well known in the art, the properties of low-emissivity coatings tend to change significantly as a result of tempering. However, it is incredibly difficult to predict the exact changes that may occur in such a coating during tempering. As a result, the design of temperable coatings is extremely unpredictable. Thus, it would be particularly desirable to provide a high shading ability low-emissivity coating that exhibits desirable properties even after being tempered.

SUMMARY OF THE INVENTION

Certain embodiments of the invention provide a transparent substrate bearing a temperable high shading performance low-emissivity coating. In these embodiments, the coating comprises, in sequence outwardly: a first infrared-reflective film; a first high absorption blocker layer deposited directly over the first infrared-reflective film, the first high absorption blocker layer comprising niobium; a middle coat comprising a transparent dielectric nitride film deposited directly over the first high absorption blocker layer; a second infrared-reflective film; a second high absorption blocker layer deposited directly over the second infrared-reflective film, the second high absorption blocker layer comprising niobium; and an outer coat comprising a transparent dielectric nitride film deposited directly over the second high absorption blocker layer. In the present embodiments, the first and second high absorption blocker layers have a combined thickness of greater than 50 angstroms.

Certain embodiments of the invention provide an insulating glass unit comprising first and second panes held in a spaced-apart configuration. The panes have confronting inner surfaces oriented toward a between-pane space and opposed outer surfaces oriented away from the between-pane space. One of the inner surfaces bears a tempered high shading performance low-emissivity coating. In these embodiments, the coating comprises first and second infrared-reflective films and first and second high absorption blocker layers positioned respectively directly over the first and second infrared-reflective films. The first and second high absorption blocker layers comprise niobium. The coating includes a middle coat comprising a transparent dielectric nitride film deposited directly over the first high absorption blocker layer. The coating also includes an outer coat comprising a transparent dielectric nitride film deposited directly over the second high absorption blocker layer. In the present embodiments, the insulating glass unit has a total visible transmittance of less than about 0.45.

Certain embodiments of the invention provide an insulating glass unit comprising first and second panes held in a spaced-apart configuration. The panes have confronting inner surfaces oriented toward a between-pane space and opposed outer surfaces oriented away from the between-pane space. One of the inner surfaces bears a tempered high shading performance low-emissivity coating. In these embodiments, the coating comprises first and second infrared-reflective films and first and second high absorption blocker layers positioned respectively directly over the first and second infrared-reflective films. The first and second high absorption blocker layers comprise niobium. The coating includes a middle coat comprising a transparent dielectric nitride film deposited directly over the first high absorption blocker layer. The coating also includes an outer coat comprising a transparent dielectric nitride film deposited directly over the second high absorption blocker layer. In the present embodiments, the insulating glass unit has a solar heat gain coefficient of less than about 0.4.

Certain embodiments of the invention provide a method of producing coated substrates. The method comprises providing a pane having generally-opposed major surfaces and depositing upon one of the major surfaces a temperable high shading performance low-emissivity coating. In the present method, the coating is deposited by depositing the following films, in sequence outwardly: a first infrared-reflective film; a first high absorption blocker layer deposited directly over the first infrared-reflective film, the first high absorption blocker layer comprising niobium; a middle coat comprising a transparent dielectric nitride film deposited directly over the first high absorption blocker layer; a second infrared-reflective film; a second high absorption blocker layer deposited directly over the second infrared-reflective film, the second high absorption blocker layer comprising niobium; and an outer coat comprising a transparent dielectric nitride film deposited directly over the second high absorption blocker layer. The first and second high absorption blocker layers are deposited at a combined thickness of greater than 50 angstroms. In some cases, the first and second high absorption blocker layers are deposited at a combined thickness of greater than 50 Å and less than about 80 Å. In these cases, the first and second infrared-reflective films are desirably deposited at a combined thickness of between about 150 Å and about 260 Å. In some cases, the transparent dielectric nitride film directly over the first high absorption blocker layer is deposited as a film comprising silicon nitride. In these cases, the silicon nitride is desirably deposited at a thickness of less than about 300 Å. In some cases, the deposition of the middle coat begins with depositing the transparent dielectric nitride film directly over the first high absorption blocker layer and ends with depositing a transparent dielectric oxide film directly beneath the second infrared-reflective layer. In these cases, the deposition of the middle coat desirably comprises depositing a plurality of alternating nitride and oxide films. For example, following deposition of the transparent dielectric nitride film directly over the first high absorption blocker layer, the method may comprise depositing the following sequence of intermediate films, moving outwardly: a first intermediate transparent dielectric oxide film, a second intermediate transparent dielectric nitride film, and a second intermediate transparent dielectric oxide film. Here, the second infrared-reflective film desirably is deposited directly over the second intermediate transparent dielectric oxide film. In some cases, the transparent dielectric nitride film directly over the second high absorption blocker layer is deposited as a film comprising silicon nitride. In these cases, the silicon nitride desirably is deposited at a thickness of less than about 100 Å. Following deposition of the transparent dielectric nitride film directly over the second high absorption blocker layer, the method may comprise depositing the following sequence of outer films, moving outwardly: a titanium nitride layer, and an outermost silicon nitride layer. Here, the titanium nitride layer desirably is deposited at a thickness of less than about 30 Å, and in some embodiments is deposited at about 1–10 Å. In some cases, the method comprises depositing an inner coat between the substrate and the first infrared-reflective film. In these cases, the inner coat desirably comprises at least one transparent dielectric film having an index of refraction of between about 1.7 and about 2.4. In some cases, the method further comprises depositing a transparent base layer between the substrate and the inner coat. Here, the transparent base layer desirably comprises silicon dioxide deposited directly upon the substrate. Preferably, the silicon dioxide is deposited at a thickness of less than about 200 Å. For example, the silicon dioxide may be deposited at a thickness of between about 50 Å and about 195 Å. In certain embodiments, the silicon dioxide is deposited at a thickness of less than 100 Å (e.g., between about 50 Å and about 90 Å).

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

A variety of substrates are suitable for use in the present invention. In most cases, the substrate 10 is a sheet of transparent material (i.e., a transparent sheet). However, the substrate 10 is not required to be transparent. For example, opaque substrates may be useful in some cases. However, it is anticipated that for most applications, the substrate will comprise a transparent or translucent material, such as glass or clear plastic. In many cases, the substrate 10 will be a glass pane. A variety of known glass types can be used, and soda-lime glass is expected to be preferred.

Tinted glass can optionally be used in certain embodiments of the invention. Many suitable types of tinted glass are available from well known glass suppliers. Thus, a temperable high shading performance coating of the invention can be applied to a pane of tinted glass, if so desired. For example, the temperable high shading performance coating can be applied to a pane of tinted glass, and this coated pane can be incorporated (e.g., as an outboard pane) into a multiple pane insulating glass unit (or "IG unit") that also includes at least one pane (e.g., an inboard pane) of clear glass. While embodiments of this nature are contemplated, the temperable high shading performance coating is particularly advantageous when used simply with clear glass.

Figure 1:
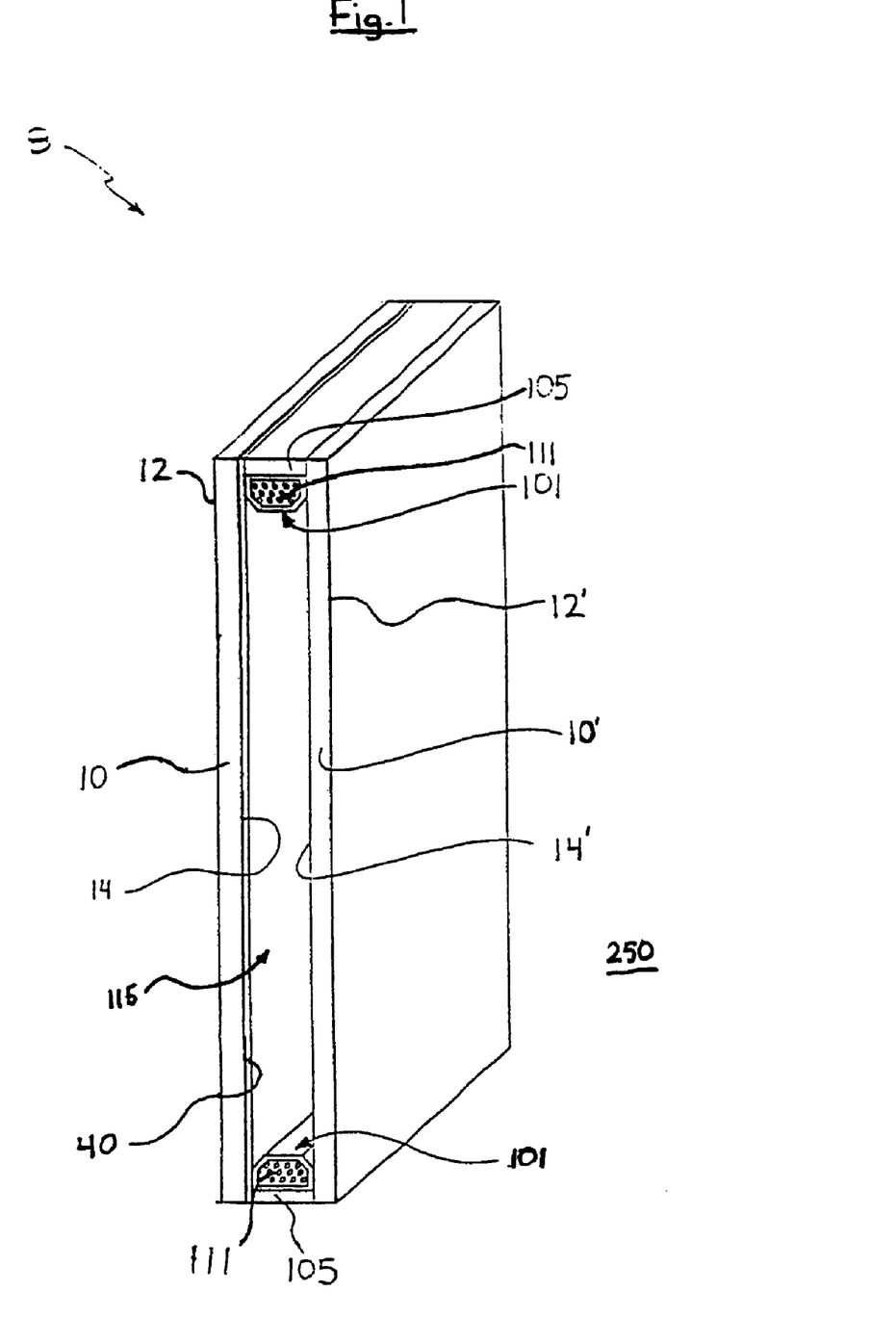
FIG. 1 is a perspective cross-sectional view of an insulating glass unit bearing a temperable high shading performance coating in accordance with certain embodiments of the present invention.

In certain embodiments, the invention provides an IG unit bearing at least one temperable high shading performance coating. IG units are well known in the present art. FIG. 1 depicts one example of an IG unit 8 that can be provided in accordance with the invention. The invention, however, is not limited to practice with any particular type of IG unit. To the contrary, all aspects of invention can be practiced with IG units of any type (fused all-glass units, vacuum units, etc.). Thus, the illustrated IG unit type is not to be construed as limiting to the invention. Further, while the term insulating "glass" unit is used throughout the present disclosure, it is to be understood that the panes need not be formed of glass. Rather, any of the noted substrate materials can be used.

The IG unit 8 shown in FIG. 1 includes a first pane 10 and a second pane 10', together forming a pair of spaced-apart panes. The panes 10, 10' bound a between-pane space 115 therebetween and an exterior space 250 thereabout. The panes have confronting inner surfaces 14, 14' oriented toward the between-pane space 115 and opposed outer surfaces 12, 12' oriented away from the between-pane space 115. In the embodiment of FIG. 1, the panes 10, 10' are held in a spaced-apart configuration (e.g., in a substantially parallel spaced-apart relationship) by a spacer 101. The spacer joins the peripheral inner surfaces of the panes. Thus, the spacer 101 and the confronting inner surfaces 14, 14' of the panes 10, 10' together define the between-pane space 115. Useful IG units, components thereof, and methods of manufacturing and using IG units are described in U.S. patent application Ser. No. 10/076,211, the entire teachings of which are incorporated herein by reference.

In the embodiment of FIG. 1, the illustrated IG unit 8 bears only one coating 40. However, other coatings can be provided on the IG unit 8, if so desired. For example, it may be desirable to provide a variety of different coatings on one or both outer surfaces 12, 12' of the IG unit 8. In certain embodiments, a hydrophilic coating (not shown) is provided on one or both outer surfaces 12, 12'. In one embodiment, the #1 surface bears a hydrophilic coating, while the #2 surface bears the temperable high shading performance coating. Useful hydrophilic coatings are disclosed in U.S. patent applications Ser. Nos. 09/868,542, 09/572,766, and 09/599,301, the entire teachings of each of which are incorporated herein by reference.

In certain other embodiments (not shown), the #1 surface bears a hydrophobic coating, while the #2 surface bears the temperable high shading performance coating. Useful hydrophobic coatings are disclosed in U.S. Pat. No. 5,424,130 (Nakanishi et al), the entire teachings of which are incorporated herein by reference.

Further, certain embodiments (not shown) provide an IG unit wherein a photocatalytic coating is provided on one or both outer surfaces 12, 12'. In one embodiment, the #1 surface bears a photocatalytic coating, and the #2 surface bears the temperable high shading performance coating. Useful photocatalytic coatings are described in U.S. Pat. Nos. 5,874,701 (Watanabe et al), U.S. Pat. No. 5,853,866 (Watanabe et al), U.S. Pat. No. 5,961,843 (Hayakawa et al.), U.S. Pat. No. 6,139,803 (Watanabe et al), U.S. Pat. No. 6,191,062 (Hayakawa et al.), U.S. Pat. No. 5,939,194 (Hashimoto et al.), U.S. Pat. Nos. 6,013,372 (Hayakawa et al.), U.S. Pat. No. 6,090,489 (Hayakawa et al.), U.S. Pat. No. 6,210,779 (Watanabe et al), U.S. Pat. No. 6,165,256 (Hayakawa et al.), and U.S. Pat. No. 5,616,532 (Heller et al.), the entire teachings of each of which are incorporated herein by reference.

Figure 4:
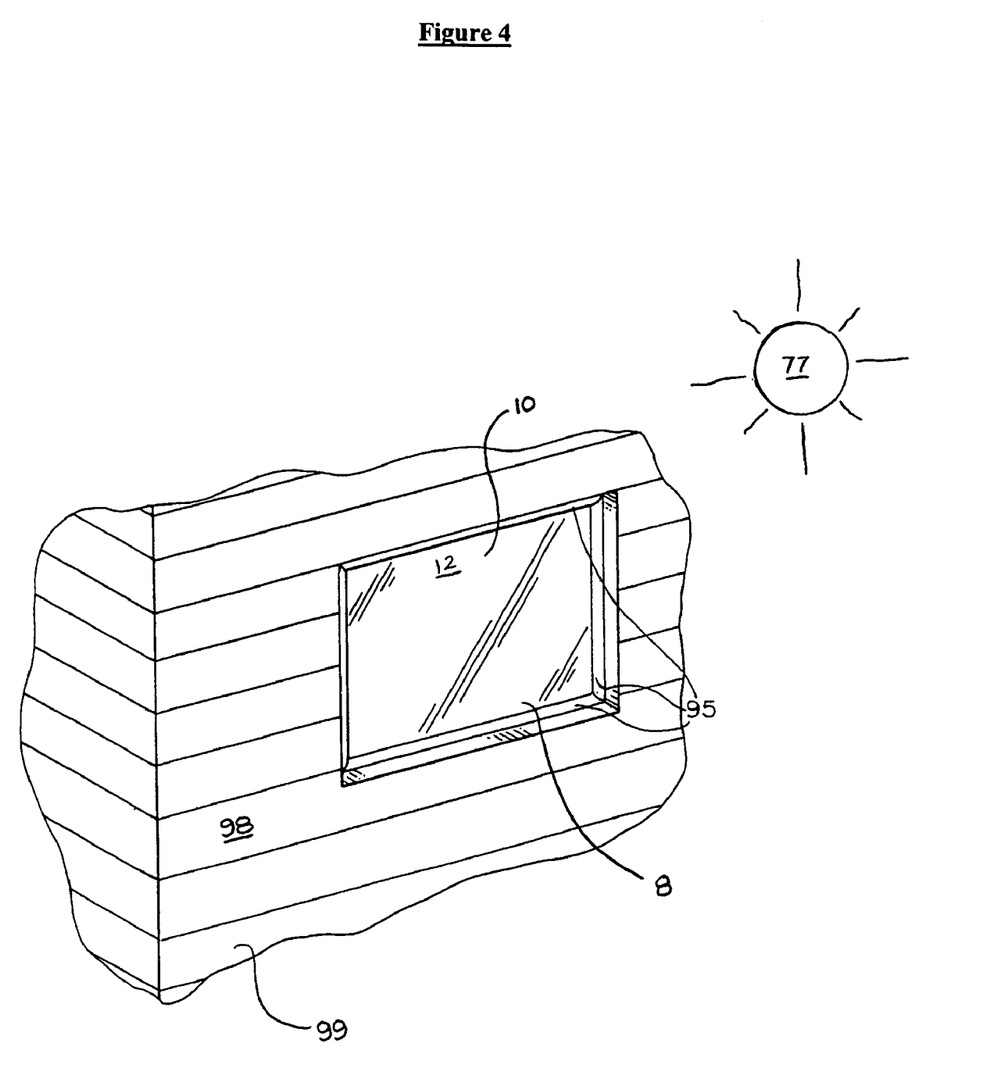
FIG. 4 is a perspective view of a glazing that bears a temperable high shading performance coating and has been mounted on the outer wall of a building in accordance with certain embodiments of the invention.

The temperable high shading performance coating is preferably carried on the "second" surface of an IG unit. This is perhaps best appreciated with reference to FIG. 1 (wherein there is illustrated an IG unit 8 bearing the present coating 40) in view of FIG. 4 (wherein the IG unit 8 is mounted on a frame in an exterior wall 98 of a building 99). Generally, the "first" (or "#1") surface is that which faces (i.e., is exposed to) an outdoor environment. Accordingly, it is the #1 surface that radiation from the sun 77 first strikes. In FIG. 4, the outer surface 12 of the first pane 10 is the so-called first surface. Moving from the #1 surface toward the interior of the building 99, the next surface is the "second" (or "#2") surface. Thus, the inner surface 14 of the first pane 10 is the so-called second surface. Moving further toward the interior of the building 99, the next surface is the "third" (or "#3") surface, followed by the "fourth" (or "#4") surface. Thus, the inner surface 14' of the second pane 10' is the so-called third surface, and the outer surface 12' of this pane 10' is the so-called fourth surface.

The temperable high shading performance coating 40 has a number of particularly beneficial properties. The ensuing discussion reports several of these properties. The reported properties are those of the coating 40 after it has been subjected to conventional glass tempering. In some cases, these properties are reported in the context of a single (i.e., monolithic) pane 10 bearing the present coating 40 on one surface 14. In other cases, these properties are reported in the context of an IG unit 8 having the present coating 40 on its #2 surface. In such cases, the reported properties have been determined for an IG unit wherein both panes are 3 mm soda lime float glass with a ½ inch between-pane space filled with an insulative gas mix of 90% argon and 10% air. Of course, these specifics are by no means limiting to the invention. Absent an express statement to the contrary, the present discussion reports determinations made using the well known Window 4.1 program under standard ASHRAE conditions.

The temperable high shading performance coating 40 has exceptional shading ability. For example, the solar heat gain coefficient of the present IG unit 8 is extraordinarily low, even as compared to other high shading ability coatings. As is well known in the art, the solar heat gain coefficient (SHGC) of a window is the fraction of incident solar radiation that is admitted through the window. The term "solar heat gain coefficient" is used herein in accordance with its well known meaning. Reference is made to NFRC 200-93 (1993), the entire teachings of which are incorporated herein by reference.

As noted above, there are many applications where low solar heat gain windows are of particular benefit. In warm climates, for example, it is desirable to have low solar heat gain windows. Further, windows that are exposed to a lot of undesirable sun benefit from having a low solar heat gain coefficient (e.g., windows on the east or west side of a building get a lot of sun in the morning and afternoon). Thus, it is beneficial to provide windows of this nature with coatings that establish a low solar heat gain coefficient. For example, a solar heat gain coefficient of about 0.4 or less is commonly recommended for buildings in the southern United States and other warm climates.

The high shading ability of the present coating 40 is particularly beneficial for warm climate applications. For example, the present IG unit 8 has a solar heat gain coefficient of less than about 0.4. In fact, the present IG unit 8 has a solar heat gain coefficient of less than about 0.3 (in particular less than about 0.28). This is exceptionally low, even as compared to other high shading ability coatings. While the precise level of shading performance can be selected and varied in accordance with the teachings of this disclosure, certain preferred embodiments (e.g., where the coating 40 is one of the uniquely preferred film stacks detailed below) provide an IG unit 8 having a solar heat gain coefficient of about 0.27. Thus, the present coating 40 is quite advantageous when high shading ability is desired.

As noted above, a limitation of some high shading ability coatings is that they reflect more visible light than is optimal. A tradeoff is sometimes made in high shading ability coatings whereby the films selected to achieve a low SHGC have the effect of restricting the visible reflectance to a level that is higher than ideal. As a consequence, windows bearing these coatings may have a somewhat mirror-like appearance.

To the contrary, the temperable high shading performance coating 40 has sufficiently low visible reflectance to obviate this mirror-like appearance problem. For example, the present IG unit 8 has an exterior visible reflectance $R_v$ (off the glass side of the first pane 10) of less than about 20%. In fact, the present IG unit 8 achieves an exterior visible reflectance $R_v$ of less than about 15% (in particular less than about 13%). While the precise level of visible reflectance can be selected and varied in accordance with the present teachings, certain preferred embodiments (e.g., where the coating 40 is one of the uniquely preferred film stacks detailed below) provide an IG unit 8 having an exterior visible reflectance $R_v$ of about 11%. This visible reflectance is exceptionally low, particularly when compared to conventional high shading ability coatings, which commonly have higher visible reflectance.

The term "visible reflectance" is well known in the art. This term is used herein in accordance with its well-known meaning to refer to the percentage of all incident visible radiation that is reflected off the glass side of a monolithic pane (which bears the coating 40 on the opposite film side) or off the exterior of the present IG unit 8. Skilled artisans will appreciate that the visible reflectance off the glass side of a monolithic pane includes not only visible radiation reflected at surface 12, but also visible radiation reflected at surface 14. Likewise, the visible reflectance off the exterior of the IG unit 8 includes not only visible radiation reflected at surface 12, but also visible radiation reflected at surfaces 14, 14', and 12'. The reported visible reflectance is measured off a central portion of the glass side of the monolithic pane 10 or off a central portion of the glass side of the outboard pane 10 of the present IG unit 8, and is indicated as $R_v$, where v stands for visible. Visible reflectance can be determined as specified in the above-noted "Standard Test Methods for Solar Energy Transmittance and Reflectance (Terrestrial) of Sheet Materials, ASTM".

The shading ability of the present coating 40 can also appreciated with reference to the transmission properties of the coating. For example, the total visible transmittance of the present IG unit 8 is typically less than about 45%. Preferably, the visible transmittance is between about 35% and about 43%. In contrast, an IG unit bearing a conventional double-silver low-emissivity coating would typically have a much higher total visible transmittance (e.g., of about 65% or higher). For some applications, such high visible transmission can create an environment that is perceived as being overly bright (the present coating 40 provides glare control as compared to high visible transmittance coatings). While the precise level of visible transmittance can be selected and varied in accordance with the teachings of this disclosure, certain preferred embodiments (e.g., where the coating 40 is one of the uniquely preferred film stacks detailed below) provide an IG unit 8 having a total visible transmittance of between about 37% and about 41% (e.g., about 39%).

Additional layers of metal are sometimes incorporated into high shading ability coatings to achieve low levels of visible transmittance. While these additional metal layers may establish low visible transmittance, they are an unnecessary complexity and are preferably avoided in the present embodiments. With the present coating 40, exceptional shading abilities can be achieved with no metal layers other than silver and blocker layers. Additional metal layers can make it exceedingly difficult to obtain a well-balanced combination of properties.

In addition to these beneficial properties, the temperable high shading performance coating 40 achieves color properties that are particularly pleasing. For example, the present coating 40 is extremely well suited for applications in which reflected color is of concern. The following discussion of color is reported using the well known color coordinates of "a" and "b". In particular, these color coordinates are indicated herein using the subscript h (i.e., $a_h$ and $b_h$) to represent the conventional use of the well known Hunter Lab Color System (Hunter methods/units, Ill. D65, 10 degree observer). The present color properties can be determined as specified in ASTM D-2244-93, "Standard Test Method For Calculation Of Color Differences From Instrumentally Measured Color Coordinates", Sep. 15, 1993, as augmented by ASTM E-308-85 Annual Book of ASTM Standards, Vol. 06.01 "Standard Method For Computing The Colors Of Objects By Using The CIE System", the entire teachings of each of which are incorporated herein by reference.

Figure 5:
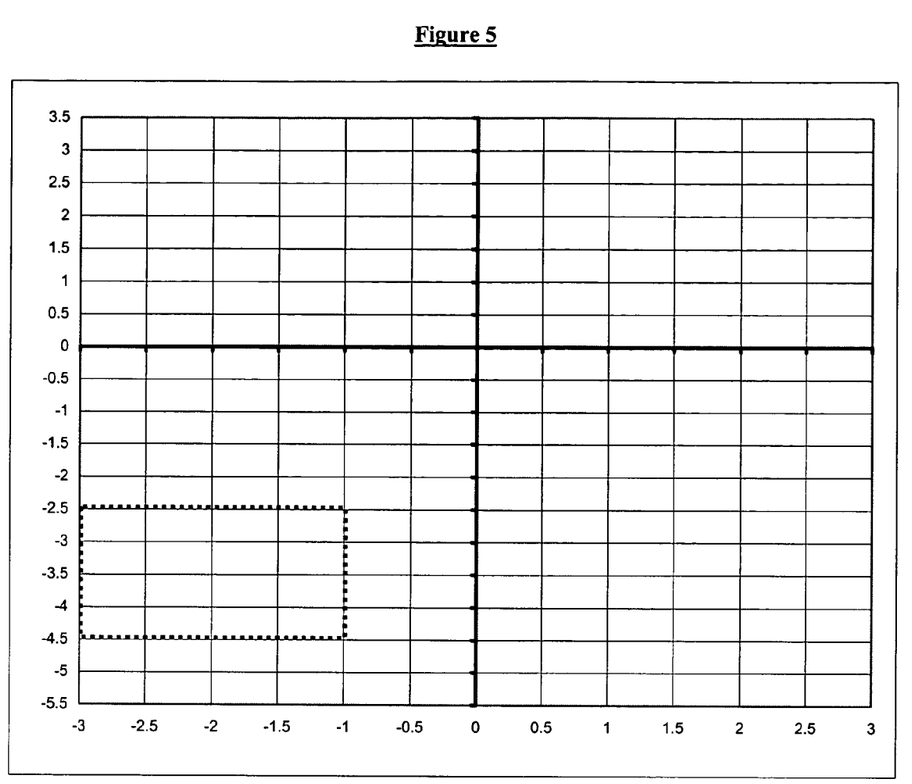
FIG. 5 is a graph of the exterior reflected color of an insulating glass unit bearing a temperable high shading performance coating in accordance with certain embodiments of the invention.

The present IG unit 8 has an exceptionally neutral (i.e., colorless) appearance in reflection, with any appreciable reflected color being of a particularly pleasing hue. The reflected color reported herein is as viewed from the exterior of the IG unit 8 (i.e., off the glass side 12 of the outboard pane 10). The reflected hue of the present IG unit 8 is entirely within the blue-green range. For example, the present IG unit 8 has an exterior reflected color characterized by an $a_h$ color coordinate of between about −0.75 and about −3.25 and a $b_h$ color coordinate of between about −2.25 and about −4.75. This reflected color range is an exceptional property of the present coating 40. While it is a commonly stated goal for coatings to achieve a generally blue or blue-green color, few high shading ability coatings actually achieve such a pleasing color. Moreover, the present coating 40 achieves the foregoing color properties after being tempered. In certain preferred embodiments (e.g., where the coating 40 is one of the uniquely preferred film stacks detailed below), the IG unit 8 exhibits an exterior reflected color characterized by an $a_h$ color coordinate of between about −1 and about −3 (e.g., about −2) and a $b_h$ color coordinate of between about −2.5 and about −4.5 (e.g., about −3.5). This is shown in FIG. 5, wherein the reflected color is represented by the color range defined by the dashed lines. In this figure, it can be appreciated that the reflected $a_h$ and $b_h$ color values are entirely negative, such that the reflected hue is entirely within the blue-green range. Further, the magnitude of the $a_h$ and $b_h$ values is exceptionally low. Thus, the present IG unit 8 has a substantially colorless appearance in reflection, which tends to look primarily gray (this is an exceptional feature of the coating 40) with any appreciable hue being blue-green. The desirability of this color range on a qualitative level (in terms of the actual appearance of a window bearing this coating 40) is one of the most advantageous aspects of the present coating 40. This is apparent when viewing a window bearing the present coating 40 in comparison to windows bearing other high shading ability coatings.

Figure 2:
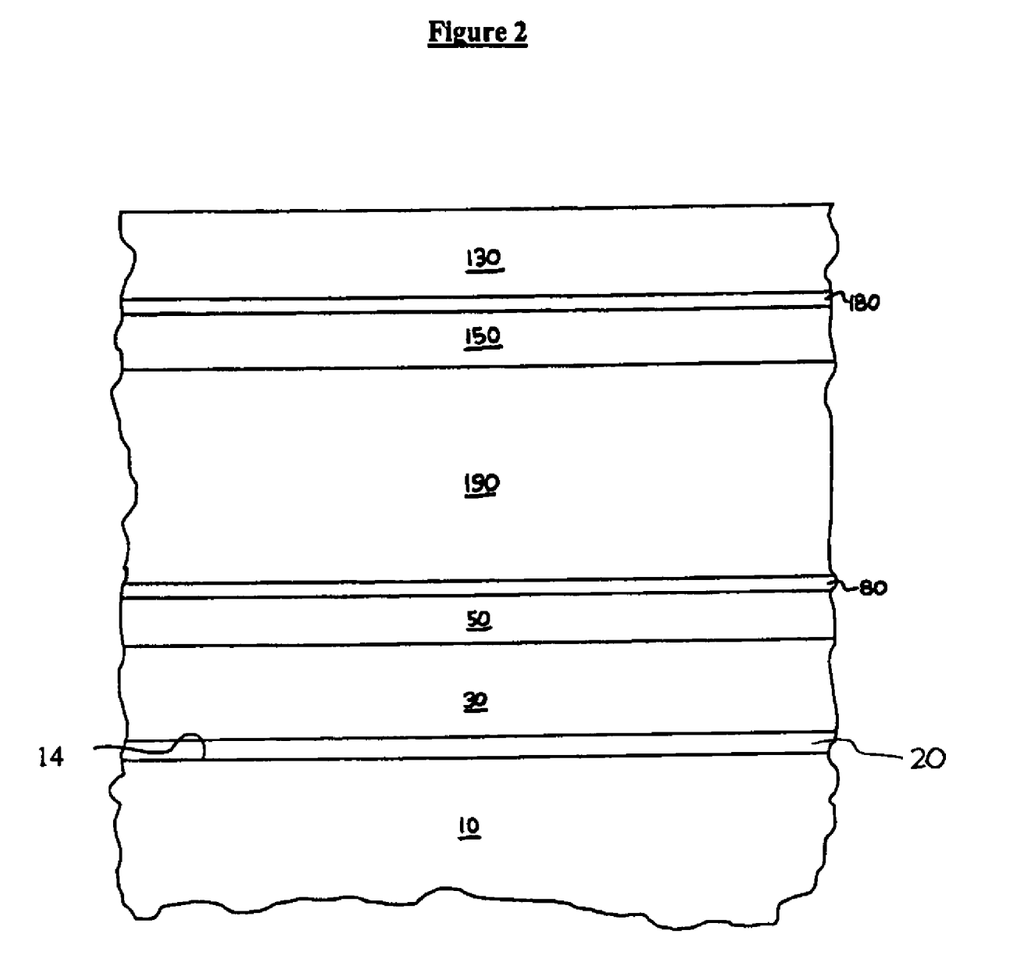
FIG. 2 is a schematic cross-sectional view of a temperable high shading performance coating on a substrate in accordance with certain embodiments of the invention.

In addition to the beneficial properties discussed above, the present IG unit 8 has desirable thermal insulating properties. The thermal insulating properties facilitated by the present coating 40 are exceptional, even as compared to other high shading ability coatings. As described below, the temperable high shading performance coating 40 includes two infrared-reflective films 50, 150. These films 50, 150 are highly reflective of infrared radiation (i.e., radiant heat). Since the infrared-reflective films 50, 150 are typically silver or another electrically conductive material, these films 50, 150 contribute low emissivity to the coating 40. For example, the emissivity of the present coating 40 is less than about 0.1. In fact, the emissivity of this coating 40 is less than about 0.08 (in particular less than about 0.07). While the precise level of emissivity can be selected and varied in accordance with the present teachings, a number of preferred coating embodiments (e.g., the uniquely preferred film stacks detailed below) provide an emissivity of about 0.063. In contrast, an uncoated pane of clear glass would typically have an emissivity of about 0.84. The emissivity of the present coating 40 is surprisingly low, especially given the exceptional combination of properties achieved by this coating.

The term "emissivity" is well known in the present art. This term is used herein in accordance with its well-known meaning to refer to the ratio of radiation emitted by a surface to the radiation emitted by a blackbody at the same temperature. Emissivity is a characteristic of both absorption and reflectance. It is usually represented by the formula: E=1–Reflectance. The present emissivity values can be determined as specified in "Standard Test Method For Emittance Of Specular Surfaces Using Spectrometric Measurements" NFRC 301-93, the entire teachings of which are incorporated herein by reference.

The "U Value" of the present IG unit 8 is also exceptionally low, even as compared to IG units bearing other high shading ability coatings. As is well known, the U Value of an IG unit is a measure of the thermal insulating property of the unit. The smaller the U value the better the insulating property of the unit. The U Value of the present IG unit 8 is less than about 0.4. In fact, the present IG unit 8 has U Value of less than about 0.3 (in particular less than about 0.28). While the precise level of U Value can be selected and varied in accordance with the present teachings, certain preferred embodiments (e.g., where the coating 40 is one of the uniquely preferred film stacks detailed below) provide an IG unit 8 wherein the U Value is about 0.26. In comparison, the U Value of an IG unit having panes of uncoated glass would typically be about 0.46. Thus, the temperable high shading performance coating 40 dramatically lowers the U Value of the IG unit 8 (i.e., it substantially improves the thermal insulating ability of the unit). The U Value facilitated by the present coating 40 is surprisingly low, especially given the exceptional combination of properties achieved by this coating 40.

The term U Value is well known in the art. It is used herein in accordance with its well-known meaning to express the amount of heat that passes through one unit of area in one unit of time for each unit of temperature difference between a hot side of the IG unit 8 and a cold side of the IG unit 8. The U Value can be determined in accordance with the standard specified for $U_{winter}$ in NFRC 100-91 (1991), the entire teachings of which are incorporated herein by reference.

FIG. 2 depicts a preferred temperable high shading performance low-emissivity coating of the invention. As can be appreciated, the coating 40 preferably includes the following films, in sequence outwardly (i.e., moving away from the substrate), a transparent base layer 20, an inner coat 30, a first infrared-reflective layer 50, a first high absorption blocker layer 80, a middle coat 190, a second infrared-reflective layer 150, a second high absorption blocker layer 180, and an outer coat 130. The present disclosure teaches particular combinations of film thicknesses and materials that achieve the exceptional properties described above.

The coating embodiment shown in FIG. 2 includes two infrared-reflective layers 50, 150 (i.e., it is a "double" type low-emissivity coating). The first 50 and second 150 infrared-reflective layers can be formed of any desired infrared-reflective material. Silver is preferred. However, gold, copper, and other infrared-reflective materials can be used. Likewise, alloys or mixtures of these materials can be used. In most cases, it will be preferable to employ silver or silver-containing layers 50, 150. The term "silver containing" is used herein to refer to any film that contains at least some silver. For example, one may provide the infrared-reflective layers 50, 150 in the form of silver combined with a small amount of gold (e.g., about 5% gold or less).

The first 50 and second 150 infrared-reflective layers are preferably provided at particular thicknesses to achieve the properties noted above. The combined thickness of the two infrared-reflective layers 50, 150 is preferably at least about 150 Å, perhaps more preferably at least about 180 Å, and in some embodiments at least about 210 Å. For example, the combined thickness of these two layers 50, 150 is preferably between about 150 Å and about 260 Å. In particular, the first infrared-reflective layer 50 is preferably provided at a thickness of between about 70 Å and about 110 Å, more preferably between about 85 Å and about 100 Å, and perhaps optimally about 90 Å. Conjointly, the second infrared-reflective layer 150 is preferably provided at a thickness of between about 100 Å and about 150 Å, more preferably between about 110 Å and about 140 Å, and perhaps optimally about 130 Å. The outer infrared-reflective layer 150 in these embodiments is thicker (e.g., by at least 14 Å, in one case by 16 Å, and in another case by 35 Å) than the inner infrared-reflective layer 50. Forming the first 50 and second 150 infrared-reflective layers of silver at these thicknesses is preferred.

The temperable high shading performance coating 40 preferably includes first 80 and second 180 high absorption blocker layers formed of particular materials at particular thicknesses. The first 80 and second 180 high absorption blocker layers are desirably deposited directly over the first 50 and second 150 infrared-reflective layers, respectively. Preferably, the high absorption blocker layers 80, 180 are thicker than conventional blocker layers. For example, the combined thickness of the two high absorption blocker layers 80, 180 is preferably greater than 50 Å, but preferably less than about 80 Å. In particular, the combined thickness of these two layers 80, 180 is preferably between about 51 Å and about 80 Å, more preferably between about 52 Å and about 75 Å, and in some cases between about 55 Å and about 70 Å. The thickness of each high absorption blocker layer is desirably greater than 25 Å. In particularly preferred embodiments, the combined thickness of the two blocker layers is greater than 50 Å but less than about 80 Å, while the combined thickness of the two infrared-reflective layers is between about 150 Å and about 260 Å.

The high absorption blocker layers 80, 180 preferably comprise niobium. In certain preferred embodiments, these layers 80, 180 are deposited as essentially pure niobium. Alternatively, they may comprise a niobium-titanium material. The term "niobium-titanium" is used herein to refer to any film that contains at least some niobium and at least some titanium. Useful niobium-titanium films and methods for their deposition are described in U.S. patent application Ser. No. 10/123,032, entitled "Thin Film Coating Having Niobium-Titanium Layer", the entire teachings of which are incorporated herein by reference.

The high absorption blocker layers 80, 180 serve a number of purposes. For example, these layers 80, 180 help establish the high shading performance of the present coating 40, while maintaining an exceptional balance of other properties (particularly color). Further, the high absorption blocker layers 80, 180 protect the underlying infrared-reflective films 50, 150 during the deposition of subsequent films and during tempering. The high absorption blocker layers 80, 180 preferably comprise niobium metal or a niobium alloy that reacts readily with oxygen, nitrogen, or other reactive gas used in depositing subsequent films and/or during tempering. This allows the blocker layers 80, 180 to capture reactive oxygen, nitrogen, etc. that would otherwise reach and react with the infrared-reflective films 50, 150. Thus, while the blocker layers 80, 180 are typically deposited as metallic film (i.e., a pure metal film or a metal alloy film), they tend to be somewhat oxidized and/or nitrided during the deposition of subsequent films and/or during tempering.

As depicted in FIG. 2, the temperable high shading performance coating 40 preferably includes an inner coat 30 deposited between the substrate 10 and the first infrared-reflective film 50. The inner coat 30 comprises at least one transparent dielectric film. The term "transparent dielectric" is used herein to refer to any non-metallic (i.e., neither a pure metal nor a metal alloy) compound that includes any one or more metals and is substantially transparent when deposited as a thin film. Included in this definition would be any metal oxide, metal nitride, metal carbide, metal sulfide, metal boride, and any combination thereof (e.g., an oxynitride). Further, the term "metal" should be understood to include all metals and semi-metals (i.e., metalloids). In particular, useful metal oxides include oxides of zinc, tin, indium, bismuth, titanium, hafnium, zirconium, and alloys and mixtures thereof. While metal oxides are advantageous due to their ease and low cost of application, metal nitrides (e.g., silicon nitride, titanium nitride, etc.) can also be used quite advantageously. Skilled artisans will be familiar with other useful transparent dielectric materials.

The outstanding properties of the temperable high shading performance coating 40 can be achieved using a surprisingly thin inner coat 30. For example, the inner coat 30 preferably has a thickness of less than about 270 Å, and in some cases less than about 240 Å. One particularly preferred range is between about 210 Å and about 225 Å. In other embodiments, the inner coat 30 is provided at an even smaller thickness, such as less than about 175 Å, and in some cases less than about 150 Å, while at the same time preferably being at least about 75 Å. In these embodiments, the physical thickness of the inner coat 30 is preferably between about 95 Å and about 135 Å, perhaps more preferably between about 100 Å and about 130 Å, and in some cases about 115 Å. In one preferred embodiment, the inner coat 30 is a zinc oxide film having a thickness within at least one of the ranges described in this paragraph. In this embodiment, the first infrared-reflective film 50 preferably comprises silver deposited directly upon this zinc oxide film.

In certain embodiments (not shown), the inner coat 30 comprises at least two films. For example, the inner coat 30 may comprise: a first inner layer (deposited directly over the transparent base layer 20) comprising an alloy or mixture of zinc oxide, such as an alloy or mixture of zinc oxide and bismuth oxide, tin oxide, or indium oxide, at a thickness of about 65 Å; and a second inner layer (deposited over the first inner layer) comprising an oxide of zinc alone at a thickness of about 50 Å. The inner coat 30 can be formed of essentially any desired number of films. Preferably, the total optical thickness (i.e., the product of physical thickness and refractive index) of the inner coat 30 (whether it consists of one or multiple films) is between about 150 Å and about 450 Å, and more preferably between about 195 Å and about 450 Å. In certain embodiments, each film of the inner coat 30 is a transparent dielectric film having a refractive index of between about 1.7 and about 2.4, and perhaps optimally about 2.0 (as compared to air, which has a refractive index of about 1).

With continued reference to FIG. 2, a transparent base layer 20 is preferably provided between the inner coat 30 and the substrate 10. The base layer 20 preferably comprises silicon dioxide deposited directly over the substrate 10. The silicon dioxide base layer 20 desirably has a thickness of less than about 200 Å, and in some cases less than 100 Å. For example, the base layer 20 preferably has a thickness of between about 50 Å and about 195 Å (e.g., about 185 Å in one case, and about 85 Å in another case). The transparent base layer 20 imparts in the coating 40 excellent durability to tempering, particularly when provided in combination with the high absorption niobium blocker layers and the preferred inner, middle, and outer coats. Useful transparent base layers are described in U.S. patent application Ser. No. 10/087,662, the entire teachings of which are incorporated herein by reference.

The temperable high shading performance coating 40 is preferably provided with a middle coat 190 between the first high absorption blocker layer 80 and the second infrared-reflective layer 150. The middle coat 190 preferably comprises a transparent dielectric nitride film, desirably silicon nitride, deposited directly over the first high absorption blocker layer 80. This is particularly advantageous in establishing the exceptional color properties of the present coating 40 after tempering or other heat treatment. In certain embodiments, this nitride film has a thickness of less than about 300 Å. For example, this nitride film preferably has a thickness of between about 160 Å and about 300 Å, and more preferably between about 165 Å and about 295 Å (e.g., about 195 Å in one case, and about 285 Å in another case).

Preferably, the middle coat 190 comprises a plurality of transparent dielectric films beginning with a nitride film directly over the first blocker layer 80 and ending with an oxide film directly beneath the second infrared-reflective layer 150. In these embodiments, it is advantageous to provide a middle coat 190 comprising a plurality of (e.g., four or more) alternating nitride and oxide films. Preferably, at least one (perhaps optimally two) of the intermediate films is amorphous or substantially amorphous. For example, one or two such intermediate films can be silicon nitride.

In certain preferred embodiments, the middle coat comprises at least four transparent dielectric films. For example, the middle coat 190 may comprise the following sequence of intermediate films, moving outwardly: a first intermediate transparent dielectric nitride film (described above) deposited directly over the first high absorption blocker layer; a first intermediate transparent dielectric oxide film; a second intermediate transparent dielectric nitride film; and a second intermediate transparent dielectric oxide film. These films can be advantageously provided in a contiguous sequence, although this is not required. Preferably, the second infrared-reflective film 150 is deposited directly over the second transparent dielectric oxide film. In some cases, the first and second intermediate nitride films comprise silicon nitride, and the first and second intermediate oxide films comprise zinc oxide. In these cases, the thickness of the first intermediate nitride film preferably is as described above, while the thickness of the first intermediate oxide film is preferably between about 195 Å and about 265 Å, more preferably between about 205 Å and about 255 Å (e.g., about 230 Å in one case, and about 220 Å in another case), and the thickness of the second intermediate nitride film is preferably between about 165 Å and about 220 Å, and more preferably between about 170 Å and about 215 Å (e.g., about 195 Å in one case, and about 175 Å in another case), with the thickness of the second intermediate oxide film desirably being much thinner (e.g., preferably between about 90 Å and about 140 Å, and more preferably between about 95 Å and about 135 Å (e.g., about 130 Å in one case, and about 110 Å in another case). If so desired, the second intermediate oxide film can be divided into two oxide films. For example, this film may comprise: a first layer (deposited over the second intermediate nitride film) of an alloy or mixture of zinc oxide, such as an alloy or mixture of zinc oxide and bismuth oxide, tin oxide, or indium oxide (e.g., at a thickness of about 50 Å); and an overlying second layer of an oxide of zinc alone (e.g., at a thickness of about 60 Å).

The total optical thickness (i.e., the product of physical thickness and refractive index) of the middle coat 190 is preferably between about 1200 Å and about 1800 Å, and more preferably between about 1300 Å and about 1700 Å. In certain embodiments, each film of the middle coat 190 is a transparent dielectric film having a refractive index of between about 1.7 and about 2.4, and perhaps optimally of about 2.0 (as compared to air, which has a refractive index of about 1).

The high shading performance coating 40 is preferably provided with an outer coat 130 positioned further from the substrate 10 than the second high absorption blocker layer 180. The outer coat 130 preferably comprises a transparent dielectric nitride film, desirably silicon nitride, deposited directly over the second high absorption blocker layer 180. This is particularly advantageous in establishing the exceptional color properties of the present coating 40 after tempering or other heat treatment. In certain embodiments, this nitride film has a thickness of less than about 100 Å, and perhaps optimally less than about 85 Å. For example, this nitride film preferably has a thickness of between about 25 Å and about 85 Å, and more preferably between about 30 Å and about 80 Å (e.g., about 30 Å in one case, and about 60 Å in another case).

In a number of preferred embodiments (not shown), the outer coat 130 comprises at least three films. For example, the outer coat 130 may comprise the following sequence of outer films, moving outwardly: a first outer transparent dielectric nitride film (described above) deposited directly over the second high absorption blocker layer 180; a second outer transparent dielectric nitride film; and a third outer transparent dielectric nitride film, which preferably is the outermost film of the coating 40. In these embodiments, the second outer nitride film is formed of a different nitride than the first and third outer nitride films. These films can be advantageously provided in a contiguous sequence, although this is not required. In some cases, the first and third outer nitride films are silicon nitride, and the second outer nitride film is titanium nitride. Thus, in certain particularly preferred embodiments, the outer coat 130 comprises (and may advantageously consist essentially of) a layer of titanium nitride sandwiched between two silicon nitride films with the resulting sandwich positioned directly over the second blocker layer 180. This arrangement is well suited for establishing the exceptional color properties of the present coating 40, after tempering or other heat treatment. In some particularly preferred embodiments of this nature, the thickness of the first outer nitride film is as described above, while the thickness of the second outer nitride film is preferably less than about 30 Å, more preferably less than about 20 Å, and perhaps as thin as about 1–10 Å, and the thickness of the third outer nitride film is preferably between about 180 Å and about 260 Å, and more preferably between about 200 Å and about 250 Å (e.g., about 225 Å in one case, and about 200 Å in another case). These thicknesses are well suited for establishing the exceptional color properties of the present coating 40.

Preferably, the outer coat 130 comprises a plurality of transparent dielectric films. The total optical thickness (i.e., the product of physical thickness and refractive index) of the outer coat 130 is preferably between about 445 Å and about 605 Å, and more preferably between about 475 Å and about 580 Å (e.g., about 520 Å). In certain embodiments, each film of the outer coat 130 is a transparent dielectric film having a refractive index of between about 1.7 and about 2.4, and perhaps optimally about 2.0 (as compared to air, which has a refractive index of about 1).

In certain particularly preferred embodiments, the first and second infrared-reflective layers 50, 150 have a combined thickness of between about 150 Å and about 260 Å, while the first and second high absorption blocker layers 80, 180 have a combined thickness of greater than 50 Å but less than about 80 Å. In these embodiments, the coating preferably comprises, in sequence outwardly: a silicon dioxide base layer; an inner coat comprising at least one transparent dielectric film; the first infrared-reflective film; the first high absorption blocker layer; the middle coat; the second infrared-reflective film; the second high absorption blocker layer; and the outer coat. Preferably, the silicon dioxide base layer has a physical thickness of between about 50 Å and about 195 Å, the inner coat has an optical thickness of between about 150 Å and about 450 Å, the middle coat has an optical thickness of between about 1200 Å and about 1800 Å, and the outer coat has an optical thickness of between about 445 Å and about 605 Å.

Two uniquely preferred temperable high shading performance film stack 40 embodiments will now be detailed. The film stack is preferably utilized as a so-called second surface coating. In particular, where the film stack is borne on the #2 surface of an IG unit, the resulting unit 8 achieves all of the beneficial properties described above. While the present disclosure focuses somewhat on IG unit embodiments, it is to be understood that the invention extends to any substrate (e.g., a monolithic substrate, such as a glass pane or a flexible film) bearing the temperable high shading performance coating 40.

A first uniquely preferred high shading performance film stack has the following structure: (1) a transparent base layer comprising silicon dioxide (perhaps comprising a small amount of aluminum, as may the case with each silicon-based film in the coating 40) deposited directly upon a glass sheet at a thickness of between about 77 Å and about 95 Å, perhaps optimally about 86 Å–87 Å; (2) an inner coat comprising zinc oxide deposited directly upon the silicon dioxide base layer at a thickness of between about 104 Å about 128 Å, perhaps optimally about 116 Å; (3) a first infrared-reflective layer comprising silver deposited directly upon the inner coat at a thickness of between about 75 Å and about 91 Å, perhaps optimally about 83 Å–84 Å; (4) a first high absorption blocker layer comprising niobium deposited directly upon the first infrared-reflective layer at a thickness of between about 24 Å and about 28 Å, perhaps optimally about 26 Å–27 Å; (5) a first intermediate film comprising silicon nitride deposited directly upon the first high absorption blocker layer at a thickness of between about 176 Å and about 215 Å, perhaps optimally about 195 Å–198A; (6) a second intermediate film comprising zinc oxide deposited directly upon the first intermediate film at a thickness of between about 207 Å and about 253 Å, perhaps optimally about 230 Å–236 Å; (7) a third intermediate film of silicon nitride deposited directly upon the second intermediate film at a thickness of between about 176 Å and about 215 Å, perhaps optimally about 195 Å–198 Å; (8) a fourth intermediate film comprising zinc oxide deposited directly upon the third intermediate film at a thickness of between about 98 Å and about 120 Å, perhaps optimally about 109 Å–110 Å; (9) a second infrared-reflective layer comprising silver deposited directly upon the fourth intermediate film at a thickness of between about 89 Å and about 109 Å, perhaps optimally about 98 Å–99 Å; (10) a second high absorption blocker layer comprising niobium deposited directly upon the second infrared-reflective layer at a thickness of between about 24 Å and about 28 Å, perhaps optimally about 26 Å; (11) a first outer film comprising silicon nitride deposited directly upon the second high absorption blocker at a thickness of between about 29 Å and about 35 Å, perhaps optimally about 32 Å; (12) a second outer film comprising titanium nitride deposited directly upon the first outer film at a thickness of less than about 20 Å, perhaps optimally about 5 Å; and (13) a third outer (and in this embodiment, outermost) film comprising silicon nitride deposited directly upon the second outer film at a thickness between about 203 Å and about 249 Å, perhaps optimally about 225 Å–226 Å.

A second uniquely preferred high shading performance film stack has the following structure: (1) a transparent base layer comprising silicon dioxide deposited directly upon a glass sheet at a thickness of about 185 Å; (2) an inner coat comprising zinc oxide deposited directly upon the silicon dioxide at a thickness of about 210 Å; (3) a first infrared-reflective layer comprising silver deposited directly upon the inner coat at a thickness of about 90 Å; (4) a first high absorption blocker layer comprising niobium deposited directly upon the first infrared-reflective layer at a thickness of about 35 Å; (5) a first intermediate film comprising silicon nitride deposited directly upon the first high absorption blocker layer at a thickness of about 285 Å; (6) a second intermediate film comprising zinc oxide deposited directly upon the first intermediate film at a thickness of about 220 Å; (7) a third intermediate film comprising silicon nitride deposited directly upon the second intermediate film at a thickness of about 175 Å; (8) a fourth intermediate film comprising zinc oxide deposited directly upon the third intermediate film at a thickness of about 130 Å; (9) a second infrared-reflective layer comprising silver deposited directly upon the fourth intermediate film at a thickness of about 120 Å; (10) a second high absorption blocker layer comprising niobium deposited directly upon the second infrared-reflective layer at a thickness of about 30 Å; (11) a first outer film comprising silicon nitride deposited directly upon the second high absorption blocker at a thickness of about 60 Å; (12) a second outer film comprising titanium nitride deposited directly upon the first outer film at a thickness of about 2 Å; and (13) a third outer (and in this embodiment, outermost) film comprising silicon nitride deposited directly upon the second outer film at a thickness of about 200 Å.

Figure 3:
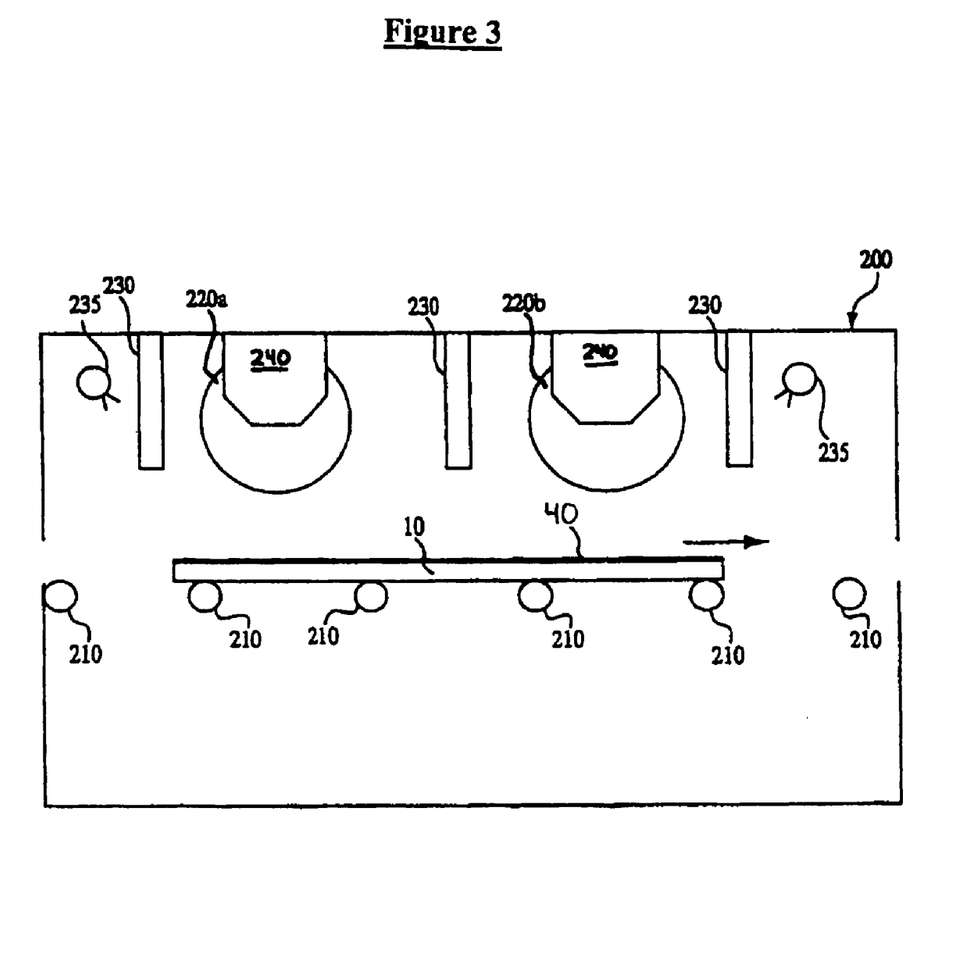
FIG. 3 is a schematic side view of a sputtering chamber that has utility in certain methods of the invention.

The invention provides methods of producing coated substrates by depositing the coating 40 (i.e., by depositing each film of any embodiment described above) onto a major surface of a desired substrate. The temperable high shading performance coating 40 can be applied by a variety of well known coating techniques. For example, the coating can be applied by sputter deposition (i.e., sputtering). Sputtering is well known in the present art. FIG. 3 depicts an exemplary magnetron sputtering chamber 200. Magnetron sputtering chambers and related equipment are commercially available from a variety of sources (e.g., Leybold and BOC Coating Technology). Useful magnetron sputtering techniques and equipment are also described in U.S. Pat. No. 4,166,018, issued to Chapin, the entire teachings of which are incorporated herein by reference. Thus, in preferred embodiments, the invention provides methods of producing coated substrates by sputter depositing onto the desired substrate each film of any above-described coating embodiment.

In favored methods of the invention, the temperable high shading performance coating 40 is applied to a substrate 10 in a multiple-chamber sputtering line. Sputtering lines are well known in the present art. A typical sputtering line includes a series of sputtering chambers aligned and connected such that a sheet-like substrate 10 can be passed from one chamber to the next by conveying the substrate 10 horizontally over spaced-apart transport rollers 210 in each of the chambers (the rollers 210 form a continuous path of substrate 10 travel through the sputtering line). The substrate 10 is typically conveyed at speeds of between about 100–500 inches per minute.

In one particular deposition method, the substrate 10 is positioned at the inlet of the sputtering line and conveyed into a first coat zone. The first coat zone is provided with three cathodes adapted to deposit a transparent base layer 20. In more detail, each of these cathodes comprises a silicon sputtering target. The silicon targets in this coat zone are sputtered in an oxidizing atmosphere to deposit a silicon dioxide base layer 20. This sputtering atmosphere may consist essentially of oxygen (e.g., about 100% $O_2$). Alternatively, this atmosphere may comprise Ar/$O_2$ (e.g., oxygen and up to about 40% argon). A power of about 36 kW is applied to the first cathode, while a power of about 37 kW is applied to the second cathode, and a power of about 37 kW is applied to the third cathode. The substrate 10 is conveyed beneath all three of these silicon targets at a rate of about 200 inches per minute, while sputtering each of these silicon targets at the described power level, such that a silicon dioxide base layer 20 is applied at a thickness of about 87 Å.

The thus coated substrate is then conveyed into a second coat zone. In this coat zone, two cathodes are used to deposit the inner coat 30. Each of these two cathodes comprises a zinc sputtering target. The zinc targets in this coat zone are sputtered in an oxidizing atmosphere to deposit a zinc oxide inner coat 30. This oxidizing atmosphere may consist essentially of oxygen (e.g., about 100% $O_2$). Alternatively, this atmosphere may comprise Ar/$O_2$ (e.g., at about 3.5 mbar). A power of about 35 kW is applied to the first cathode, and a power of about 25 kW is applied to the second cathode. The substrate 10 is conveyed beneath both of these zinc targets at a rate of about 200 inches per minute, while sputtering each of these zinc targets at the described power level, such that a zinc oxide inner coat 30 is applied at a thickness of about 116 Å.

The substrate 10 is then conveyed into a third coat zone where the first infrared-reflective layer 50 and the first high absorption blocker layer 80 are deposited. This coat zone preferably contains an inert atmosphere (e.g., argon at about 4 mbar). The first sputtering bay of this coat zone has a cathode comprising a silver target. A power of about 4 kW is applied to this cathode, while the substrate 10 is conveyed beneath this silver target at about 200 inches per minute, to deposit the first infrared-reflective silver layer 50 directly over the zinc oxide inner coat 30 at a thickness of about 84 Å. A subsequent sputtering bay of this coat zone has a cathode comprising a niobium target. A power of about 6 kW is applied to this cathode, while the substrate 10 is conveyed beneath this niobium target at a rate of about 200 inches per minute, to deposit the first high absorption niobium blocker layer at a thickness of about 27 Å. The substrate 10 is then conveyed through four subsequent coat zones to deposit the middle coat 190, as will now be described.

The thus coated substrate is conveyed through a subsequent coat zone having three sputtering bays each with a cathode comprising a silicon target. All three of these targets are sputtered in a nitriding atmosphere to deposit the innermost portion of the middle coat 190. The sputtering atmosphere can be nitrogen at a pressure of about 3.5–5 mbar. The substrate 10 is conveyed beneath all three of these targets at a rate of about 200 inches per minute, while a power of about 52 kW is applied to the first cathode, a power of about 51 kW is applied to the second cathode, and a power of about 55 kW is applied to the third cathode. This results in the deposition of about 199 Å of silicon nitride directly upon the first high absorption niobium blocker layer 80.

The thus coated substrate is then conveyed into a subsequent coat zone having three sputtering bays each with a cathode comprising a zinc target. This coat zone contains an oxidizing atmosphere, as described above (e.g., with reference to the inner coat 30). A power of about 39 kW is applied to the first cathode, while a power of about 43 kW is applied to the second cathode, and a power of about 42 kW is applied to the third cathode. By conveying the substrate 10 beneath these targets at about 200 inches per minute, while sputtering each target at the described power level, zinc oxide is applied at a thickness of about 236 Å directly over the underlying silicon nitride.

The thus coated substrate is then conveyed into a subsequent coat zone having three sputtering bays each with a cathode comprising a silicon target. All three of these targets are sputtered in a nitriding atmosphere (as described above). The substrate 10 is conveyed beneath all three of these targets at a rate of about 200 inches per minute, while a power of about 52 kW is applied to the first cathode, a power of about 54 kW is applied to the second cathode, and a power of about 50 kW is applied to the third cathode. This results in the deposition of 196 Å of silicon nitride directly upon the underlying zinc oxide.

The thus coated substrate is then conveyed into a subsequent coat zone wherein the outermost portion of the middle coat 190 is applied. This coat zone has three sputtering bays each with a cathode comprising a zinc target. This coat zone contains an oxidizing atmosphere (e.g., as described above with reference to the inner coat 30). A power of about 13 kW is applied to the first cathode, while a power of about 15 kW is applied to the second cathode, and a power of about 25 kW is applied to the third cathode. By conveying the substrate 10 beneath these targets at about 200 inches per minute, while sputtering each target at the described power level, zinc oxide is applied at a thickness of about 110 Å. This 110 Å of zinc oxide forms the outermost portion of the middle coat 190.

The substrate 10 is then conveyed into a subsequent coat zone wherein the second infrared-reflective film 150 and the second high absorption blocker layer 180 are deposited. This coat zone preferably contains an inert atmosphere (described above). The first sputtering bay of this coat zone has a cathode comprising a silver target. A power of about 5 kW is applied to this cathode. By conveying the substrate beneath this target at about 200 inches per minute, while sputtering this target at the described power level, the second infrared-reflective silver layer 150 is deposited at a thickness of about 98 Å. The second sputtering bay of this coat zone has a cathode comprising a niobium target. A power of about 6 kW is applied to this cathode, while the substrate 10 is conveyed beneath this target at a rate of about 200 inches per minute, to deposit the second high absorption niobium blocker layer 180 at a thickness of about 26 Å. The substrate 10 is then conveyed through two more active coat zones to deposit the outer coat 130, as will now be described.

The substrate 10 is conveyed through two subsequent coat zones collectively containing a first silicon target, a titanium target, a second silicon target, a third silicon target, a fourth silicon target, and a fifth silicon target. All six of these targets are sputtered in nitriding atmosphere. A power of about 26 kW is applied to the cathode comprising the first silicon target, a power of about 7 kW is applied to the cathode comprising the titanium target, a power of about 60 kW is applied to the cathode comprising the second silicon target, a power of about 49 kW is applied to the cathode comprising the third silicon target, a power of about 42 kW is applied to the cathode comprising the fourth silicon target, and a power of about 30 kW is applied to the cathode comprising the fifth silicon target. By conveying the substrate 10 beneath these six targets at a rate of about 200 inches per minute, while sputtering each target at the described power level, the outer coat 130 can be applied in the following form: 32 Å of silicon nitride directly over the second high absorption blocker layer 180; 5 Å of titanium nitride directly over this 32 Å of silicon nitride; and 225 Å of silicon nitride directly over this 5 Å of titanium nitride. This 225 Å of silicon nitride forms the outermost portion of the outer coat 130, and thus completes the temperable high shading performance coating 40 of one particular embodiment.

Absent an express indication to the contrary, all thicknesses reported herein are physical thicknesses, rather than optical thicknesses.

While preferred embodiments of the present invention have been described, it should be understood that numerous changes, adaptations, and modifications can be made therein without departing from the spirit of the invention and the scope of the appended claims.

What is claimed is:

1. A transparent substrate bearing a temperable high shading performance low-emissivity coating comprising, in sequence outwardly:
    (a) a first infrared-reflective film;
    (b) a first high absorption blocker layer deposited directly over the first infrared-reflective film, the first high absorption blocker layer being deposited as essentially pure niobium;
    (c) a middle coat comprising a plurality of transparent dielectric films beginning with a nitride film deposited directly over the first high absorption blocker layer and ending with an oxide film directly beneath a second infrared-reflective film;
    (d) the second infrared-reflective film;

(e) a second high absorption blocker layer deposited directly over the second infrared-reflective film, the second high absorption blocker layer being deposited as essentially pure niobium; and (f) an outer coat comprising a transparent dielectric nitride film deposited directly over the second high absorption blocker layer;

wherein the first and second high absorption blocker layers have a combined thickness of greater than 50 angstroms.

2. The transparent substrate of claim 1 wherein the first and second high absorption blocker layers have a combined thickness of less than about 80 Å.

3. The transparent substrate of claim 2 wherein the first and second infrared-reflective films have a combined thickness of between about 150 Å and about 260 Å.

4. The transparent substrate of claim 1 wherein the transparent dielectric nitride film directly over the first high absorption blocker layer comprises silicon nitride.

5. The transparent substrate of claim 4 wherein the silicon nitride has a thickness of less than about 300 Å.

6. The transparent substrate of claim 1 wherein the middle coat comprises a plurality of alternating nitride and oxide films.

7. The transparent substrate of claim 6 wherein the transparent dielectric nitride film directly over the first high absorption blocker layer is followed by the following sequence of intermediate films, moving outwardly: a first intermediate transparent dielectric oxide film, a second intermediate transparent dielectric nitride film, and said oxide film directly beneath the second infrared-reflective film.

8. The transparent substrate of claim 1 wherein the transparent dielectric nitride film directly over the second high absorption blocker layer comprises silicon nitride.

9. The transparent substrate of claim 8 wherein the silicon nitride has a thickness of less than about 100 Å.

10. The transparent substrate of claim 1 wherein the transparent dielectric nitride film directly over the second high absorption blocker layer is followed by the following sequence of outer films, moving outwardly: a titanium nitride layer, and an outermost silicon nitride layer.

11. The transparent substrate of claim 10 wherein the titanium nitride layer has a thickness of less than about 30 Å.

12. The transparent substrate of claim 1 wherein the coating comprises an inner coat between the substrate and the first infrared-reflective film, the inner coat comprising at least one transparent dielectric film having an index of refraction of between about 1.7 and about 2.4.

13. The transparent substrate of claim 12 wherein the coating further includes a transparent base layer between the substrate and the inner coat, the transparent base layer comprising silicon dioxide deposited directly upon the substrate.

14. The transparent substrate of claim 1 wherein the coating has an emissivity of less than about 0.08.

15. An insulating glass unit comprising first and second panes held in a spaced-apart configuration, the panes having confronting inner surfaces oriented toward a between-pane space and opposed outer surfaces oriented away from the between-pane space, one of said inner surfaces bearing a tempered high shading performance low-emissivity coating comprising first and second infrared-reflective films and first and second high absorption blocker layers positioned respectively directly over the first and second infrared-reflective films, the first and second high absorption blocker layers having a combined thickness of greater than 50 Å and being deposited as essentially pure niobium, said coating including a middle coat comprising a plurality of transparent dielectric films beginning with a nitride film deposited directly over the first high absorption blocker layer and ending with an oxide film directly beneath the second infrared-reflective film, the insulating glass unit having a total visible transmittance of less than about 0.45.

16. The insulating glass unit of claim 15 wherein the total visible transmittance is between about 0.35 and about 0.43.

17. The insulating glass unit of claim 15 wherein the coating has an emissivity of less than about 0.08.

18. The insulating glass unit of claim 15 wherein the insulating glass unit has an exterior visible reflectance of less than about 15%.

19. The insulating glass unit of claim 18 wherein the exterior visible reflectance is less than about 13%.

20. The insulating glass unit of claim 15 wherein the insulating glass unit has an exterior reflected color characterized by an $a_h$ color coordinate of between about −0.75 and about −3.25 and a $b_h$ color coordinate of between about −2.25 and about −4.75.

21. The insulating glass unit of claim 15 wherein the first and second infrared-reflective films have a combined thickness of between about 150 Å and about 260 Å, and wherein the first and second high absorption blocker layers have a combined thickness of greater than 50 Å but less than about 80 Å.

22. The insulating glass unit of claim 21 wherein the coating comprises, in sequence outwardly:

(a) a silicon dioxide base layer;
(b) an inner coat comprising at least one transparent dielectric film;
(c) the first infrared-reflective film;
(d) the first high absorption blocker layer;
(e) the middle coat;
(f) the second infrared-reflective film;
(g) the second high absorption blocker layer; and
(h) an outer coat comprising at least one transparent dielectric film.

23. The insulating glass unit of claim 22 wherein the inner coat has an optical thickness of between about 150 Å and about 450 Å, the middle coat has an optical thickness of between about 1200 Å and about 1800 Å, and the outer coat has an optical thickness of between about 445 Å and about 605 Å.

24. An insulating glass unit comprising first and second panes held in a spaced-apart configuration, the panes having confronting inner surfaces oriented toward a between-pane space and opposed outer surfaces oriented away from the between-pane space, one of said inner surfaces bearing a tempered high shading performance low-emissivity coating comprising first and second infrared-reflective films and first and second high absorption blocker layers positioned respectively directly over the first and second infrared-reflective films, the first and second high absorption blocker layers having a combined thickness of greater than 50 Å and being deposited as essentially pure niobium, said coating including a middle coat comprising a plurality of transparent dielectric films beginning with a nitride film deposited directly over the first high absorption blocker layer and ending with an oxide film directly beneath the second infrared-reflective film, the insulating glass unit having a solar heat gain coefficient of less than about 0.4.

25. The insulating glass unit of claim 24 wherein the solar heat gain coefficient is less than about 0.3.

26. The insulating glass unit of claim 24 wherein the coating has an emissivity of less than about 0.08.

27. The insulating glass unit of claim 24 wherein the insulating glass unit has an exterior visible reflectance of less than about 15%.

28. The insulating glass unit of claim 27 wherein the exterior visible reflectance is less than about 13%.

29. The insulating glass unit of claim 24 wherein the insulating glass unit has an exterior reflected color characterized by an $a_h$ color coordinate of between about −0.75 and about −3.25 and a $b_h$ color coordinate of between about −2.25 and about −4.75.

30. The insulating glass unit of claim 24 wherein the first and second infrared-reflective films have a combined thickness of between about 150 Å and about 260 Å, and wherein the first and second high absorption blocker layers have a combined thickness of greater than 50 Å but less than about 80 Å.

31. The insulating glass unit of claim 30 wherein the coating comprises, in sequence outwardly:

(a) a silicon dioxide base layer;

(b) an inner coat comprising at least one transparent dielectric film;

(c) the first infrared-reflective film;

(d) the first high absorption blocker layer;

(e) the middle coat;

(f) the second infrared-reflective film;

(g) the second high absorption blocker layer; and (h) an outer coat comprising at least one transparent dielectric film.

32. The insulating glass unit of claim 31 wherein the inner coat has an optical thickness of between about 150 Å and about 450 Å, the middle coat has an optical thickness of between about 1200 Å and about 1800 Å, and the outer coat has an optical thickness of between about 445 Å and about 605 Å.

* * * * *